United States Patent
Noma et al.

(10) Patent No.: US 12,377,842 B2
(45) Date of Patent: Aug. 5, 2025

(54) VEHICLE CONTROL DEVICE AND VEHICLE CONTROL SYSTEM

(71) Applicant: HITACHI ASTEMO, LTD., Hitachinaka (JP)

(72) Inventors: Yusuke Noma, Hitachinaka (JP); Shunsuke Katoh, Hitachinaka (JP); Hidehiro Toyoda, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 238 days.

(21) Appl. No.: 18/003,219

(22) PCT Filed: Feb. 12, 2021

(86) PCT No.: PCT/JP2021/005156
§ 371 (c)(1),
(2) Date: Dec. 23, 2022

(87) PCT Pub. No.: WO2022/004042
PCT Pub. Date: Jan. 6, 2022

(65) Prior Publication Data
US 2023/0242107 A1    Aug. 3, 2023

(30) Foreign Application Priority Data
Jun. 29, 2020    (JP) .................. 2020-111916

(51) Int. Cl.
*B60W 30/095*    (2012.01)
*B60W 30/09*    (2012.01)
*B60W 60/00*    (2020.01)

(52) U.S. Cl.
CPC ........ *B60W 30/0956* (2013.01); *B60W 30/09* (2013.01); *B60W 60/001* (2020.02); *B60W 2554/40* (2020.02)

(58) Field of Classification Search
None
See application file for complete search history.

(56) References Cited

U.S. PATENT DOCUMENTS

2016/0288785 A1*    10/2016    Ezoe ............... B60W 30/18145
2019/0106104 A1*    4/2019    Inoue ........................ B60T 7/22
(Continued)

FOREIGN PATENT DOCUMENTS

CN    111338340 A *    6/2020    ......... G01C 21/3415
JP    2013-186724 A    9/2013
(Continued)

OTHER PUBLICATIONS

Machine translation of JP-2017206117-A (Year: 2024).*
(Continued)

*Primary Examiner* — Aniss Chad
*Assistant Examiner* — Jennifer M Anda
(74) *Attorney, Agent, or Firm* — Foley & Lardner LLP

(57) ABSTRACT

Realized is a vehicle control device capable of performing automatic driving control that does not reduce turning accuracy of a host vehicle even when an object in a blind spot is different from an assumption and a vehicle speed decreases due to a rapid deceleration. A vehicle control device 10 includes a blind spot object estimation unit 24 that detects a blind spot region 320 of an external-field recognition sensor 12 that recognizes an external field and estimates a blind spot object 310 potential in the blind spot region 320, and a future trajectory generation unit 26 that generates a future trajectory of a host vehicle in consideration of a potential risk from the blind spot object 310 estimated by the blind spot object estimation unit 24 and surrounding information of a vehicle 1 that is the host vehicle. Furthermore, the vehicle control device 10 includes a target steering angle calculation unit 40 that calculates a (Continued)

curvature radius at which the vehicle 1 travels from the future trajectory generated by the future trajectory generation unit 26 and a past trajectory of the vehicle 1, and calculates a target steering angle of the vehicle 1 from the calculated curvature radius and an acceleration/deceleration of the vehicle 1.

8 Claims, 9 Drawing Sheets

(56) References Cited

U.S. PATENT DOCUMENTS

| | | | |
|---|---|---|---|
| 2019/0111922 A1* | 4/2019 | Nath | G06V 20/588 |
| 2020/0317219 A1* | 10/2020 | Yoshida | B62D 15/0255 |
| 2021/0197811 A1* | 7/2021 | Tsushima | G08G 1/167 |
| 2022/0348227 A1* | 11/2022 | Foster | G06V 20/588 |
| 2023/0021615 A1* | 1/2023 | Inaba | F16D 61/00 |

FOREIGN PATENT DOCUMENTS

| | | | |
|---|---|---|---|
| JP | 2016-122308 A | | 7/2016 |
| JP | 2017206117 A | * | 11/2017 |
| JP | 2019-069659 A | | 5/2019 |
| JP | 2020-032873 A | | 3/2020 |
| WO | WO-2017/208786 A1 | | 12/2017 |

OTHER PUBLICATIONS

Machine translation of CN-111338340—(Year: 2024).*
International Search Report with English Translation and Written Opinion of International Application No. PCT/JP2021/005156 dated May 25, 2021.

* cited by examiner

TRAVELING DIRECTION OF VEHICLE

VEHICLE CONTROL DEVICE AND VEHICLE CONTROL SYSTEM

TECHNICAL FIELD

The present invention relates to a vehicle control device and a vehicle control system that control a vehicle such as an automobile.

BACKGROUND ART

A driving assistance device disclosed in PTL 1 is known as a conventional technique for realizing driving assistance considering potential risk of a pedestrian or the like hidden in a blind spot of an obstacle near a host vehicle.

For example, the abstract of PTL 1 discloses the driving assistance device "including calculation means for calculating, when an object that causes a blind spot exists in front of a host vehicle, a standard speed that is a speed to be taken by the host vehicle in order to avoid a collision between a virtual moving object assumed to exist in the blind spot of the object and the host vehicle, estimation means for estimating a risk degree related to a road on which the host vehicle is traveling based on environment information indicating a traveling environment related to the host vehicle, and correction means for correcting the calculated standard speed based on the estimated risk degree".

Further, the paragraph [0040] of the specification of PTL 1 discloses that "the risk degree estimation unit 12 further extracts one or a plurality of pieces of information (that is, near miss cases) corresponding to the estimated road environment and traffic environment based on tag information added to each of a plurality of pieces of information included in a near miss database. The risk degree estimation unit 12 estimates the risk degree in comprehensive consideration of the estimated road environment and traffic environment and one or a plurality of pieces of extracted information".

As described above, in a road environment where there is a blind spot such as a residential area, a method of realizing safer automatic driving by predicting the type of a virtual moving object hidden in a blind spot based on near miss data and predicting the jumping out of the virtual moving object has been developed.

CITATION LIST

Patent Literature

PTL 1: JP 2019-069659 A

SUMMARY OF INVENTION

Technical Problem

In the technique disclosed in PTL 1, the standard speed that is the speed to be taken by the host vehicle in order to avoid the collision between the virtual moving object assumed to exist in the blind spot of an object and the host vehicle is calculated. Then, the risk degree related to the road on which the host vehicle is traveling is estimated based on the environment information indicating the traveling environment of the host vehicle, the standard speed calculated based on the estimated risk degree is corrected, and the vehicle passes through the periphery of the blind spot at the corrected speed.

Therefore, when the estimated risk degree is wrong, for example, when the moving object that actually jumping out from the blind spot is different from the estimation, rapid deceleration may be required to handle the actual situation, and there is a probability that the automatic steering control becomes unstable as a result of the rapid deceleration.

An object of the present invention is to realize a vehicle control device and a vehicle control system capable of performing automatic driving control that does not reduce turning accuracy of a host vehicle even when an object in a blind spot is different from an estimation and a vehicle speed decreases due to rapid deceleration.

Solution to Problem

In order to achieve the above object, the present invention is configured as follows.

A vehicle control device includes a blind spot object estimation unit that detects a blind spot region of an external-field recognition sensor that recognizes an external field and estimates a blind spot object potential in the blind spot region, a future trajectory generation unit that generates a future trajectory of a host vehicle in consideration of a potential risk from the blind spot object estimated by the blind spot object estimation unit and surrounding information of the host vehicle, and a target steering angle calculation unit that calculates a curvature radius at which the host vehicle travels from the future trajectory generated by the future trajectory generation unit and a past trajectory of the host vehicle, and calculates a target steering angle of the host vehicle from the calculated curvature radius and an acceleration/deceleration of the host vehicle.

Further, a vehicle control system includes an external-field recognition sensor that detects and recognizes an external field, an engine control device, a brake control device, a steering device, and a vehicle control device including a target acceleration/deceleration calculation unit that outputs a target acceleration to the engine control device or outputs a target deceleration to the brake control device, and a target steering angle calculation unit that calculates a target steering angle and outputs the target steering angle to the steering device. The vehicle control device estimates a blind spot object in a blind spot region that is undetectable by the external-field recognition sensor, calculates a curvature radius when a host vehicle turns at a rapidly decelerated speed, and outputs a target steering angle calculated based on the curvature radius to the steering device. The steering device controls steering in accordance with the target steering angle.

Advantageous Effects of Invention

It is possible to realize a vehicle control device and a vehicle control system capable of performing automatic driving control that does not reduce turning accuracy of a host vehicle even when an object in a blind spot is different from an estimation and a vehicle speed decreases due to rapid deceleration.

DESCRIPTION OF EMBODIMENTS

Hereinafter, an embodiment of a vehicle control device and a vehicle control system according to the present invention will be described with reference to the accompanying drawings.

Embodiment

Figure 1:
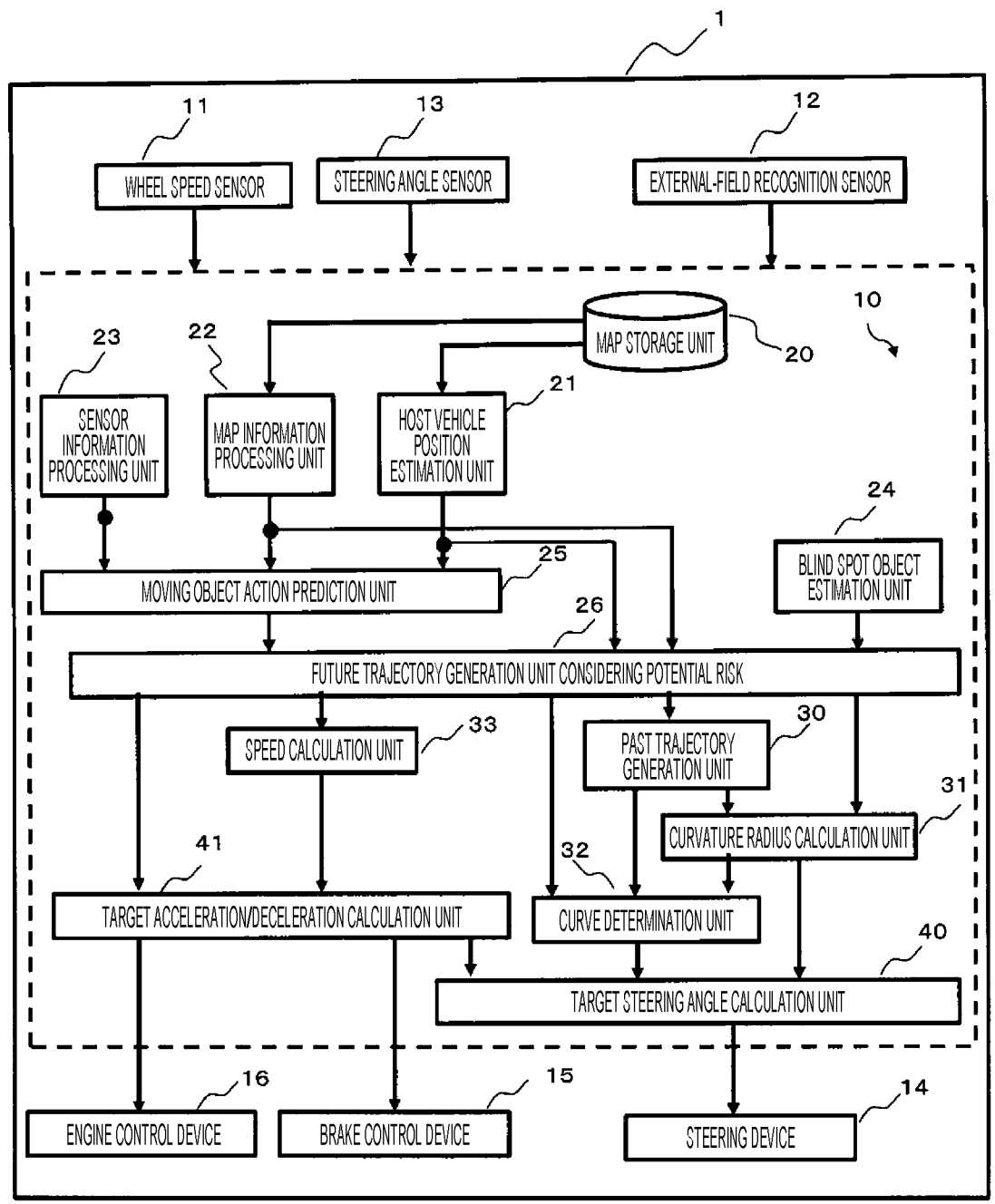
FIG. 1 is a block diagram illustrating an aspect of a vehicle control system of the present invention.

FIG. 1 is a block diagram illustrating an aspect of a vehicle control system of the present invention, and illustrates a vehicle control system mounted on a vehicle 1 (host vehicle) and a vehicle control device 10 included in the vehicle control system. The vehicle control device 10 has a configuration illustrated within a broken line.

In FIG. 1, the vehicle control device 10 is a system that calculates a curvature radius from a future trajectory (future traveling trajectory) considering a potential risk and a past trajectory (past traveling trajectory), calculates a target steering angle for the future trajectory considering the potential risk, and then travels. The past trajectory may be generated from the future trajectory considering a potential risk, or may be a past trajectory acquired from a GNSS (global navigation satellite system).

It is assumed below that the past trajectory is generated from the future trajectory considering the potential risk.

The vehicle control system of the vehicle 1 on which the vehicle control device 10 is mounted includes a wheel speed sensor 11, an external-field recognition sensor 12, a steering angle sensor 13, a steering device 14, a brake control device 15, and an engine control device 16.

The wheel speed sensor 11 is a wheel speed sensor that measures the wheel speed of the vehicle 1.

The external-field recognition sensor 12 is a sensor that detects and recognizes an external field, and is a sensor that recognizes course information such as a travel route and an obstacle of the vehicle 1 by using a camera, a radar, a global navigation satellite system (GNSS) and map information in combination.

The steering angle sensor 13 is a steering angle sensor that measures a steering angular velocity and a steering angle of the vehicle. The steering device 14 is a device as an aspect of a power steering device capable of electrically controlling a target steering angle.

The brake control device 15 is a device as an aspect of a mechanical brake device capable of electrically controlling a target deceleration. The engine control device 16 is a device as an aspect of an engine device capable of electrically controlling a target acceleration.

A map storage unit 20 stores road information and traffic light information from a start point of automatic driving of the vehicle 1 to a target point, route information from the current position to the target point, a traffic rule database of a section where the vehicle 1 travels, and the like.

A host vehicle position estimation unit 21 estimates a location (position) where the vehicle 1 (host vehicle) is present based on surrounding information (surrounding environment information) obtained by the external-field recognition sensor 12, a point cloud database (map information) stored in the map storage unit 20, a vehicle speed of the vehicle 1 (host vehicle) obtained by the wheel speed sensor 11, information obtained by the global navigation satellite system (GNSS), and the like.

The map information processing unit 22 organizes lighting information and the like of a traffic light on which the vehicle 1 is scheduled to travel based on lane center line information and traffic light information of a road necessary for performing automatic driving based on the map information stored in the map storage unit 20, converts the lighting information and the like into a format usable for automatic driving of the vehicle 1 (host vehicle), and outputs the result of the conversion (generates and outputs travel use information).

The sensor information processing unit 23 receives an input of the surrounding environment information obtained based on output information (external field information) of the external-field recognition sensor 12, converts the surrounding environment information into object information of a moving object existing around the vehicle 1, and outputs the object information as surrounding information of the vehicle 1 (host vehicle). Specific examples of the object information include information indicating an attribute (type) of a moving object such as a pedestrian, a bicycle, or a vehicle, and information indicating a current position and a current speed vector of the moving object. Note that the moving object includes an object (for example, a stopped vehicle, a parked vehicle, or the like) that is currently stopped but may operate in the future.

The respective outputs of the host vehicle position estimation unit 21, the map information processing unit 22, and the sensor information processing unit 23 are input to a moving object action prediction unit 25. The moving object action prediction unit 25 predicts and calculates a future position and a future speed of each moving object existing around the vehicle 1 (host vehicle) based on the input information, and calculates a risk for a host vehicle future trajectory. For example, the prediction and calculation of the speed may be calculated by linear prediction.

The moving object action prediction unit 25 does not estimate a moving object such as a blind spot object 310 estimated by a blind spot object estimation unit 24 described later.

Figure 2:
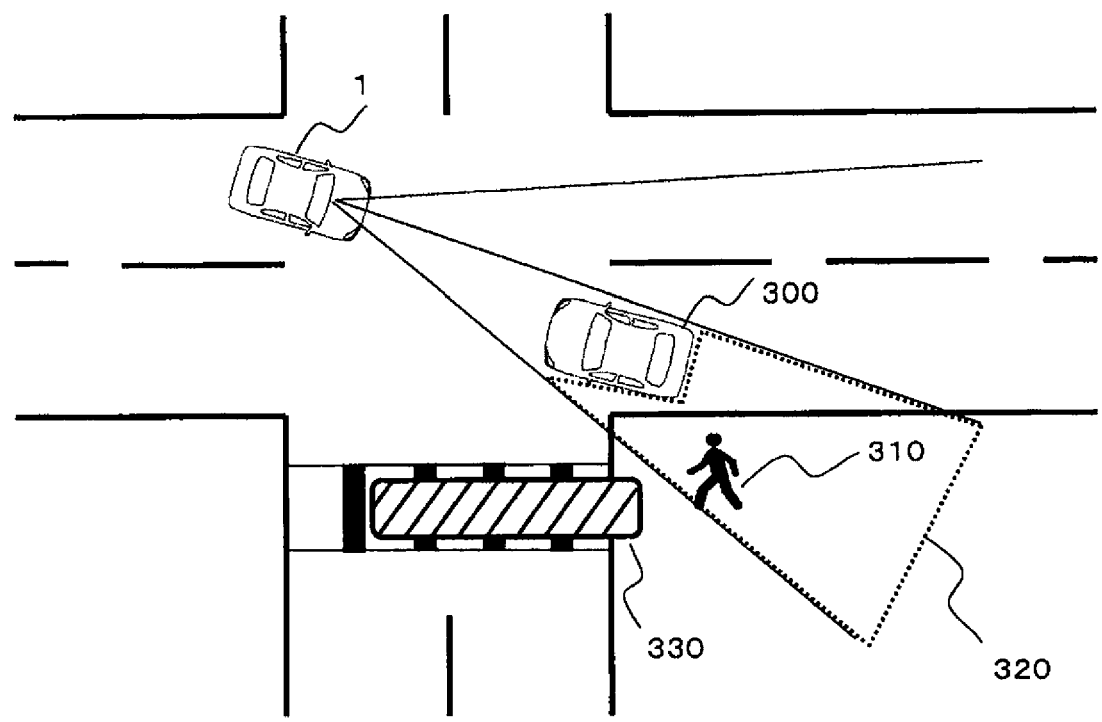
FIG. 2 is an explanatory diagram of blind spot object estimation.

The blind spot object estimation unit 24 will be described by using the example illustrated in FIG. 2. FIG. 2 is an explanatory diagram of blind spot object estimation.

In FIG. 2, various types of information necessary for estimating a blind spot object 310, which is a virtual moving object (pedestrian, bicycle, other vehicle, and the like) potential in a blind spot region 320 of a nearby obstacle, are acquired. Specifically, road information and map information are acquired from the map storage unit 20, and surrounding information and the like from the sensor information processing unit 23 are acquired.

Then, the blind spot object estimation unit 24 detects the blind spot region 320 around the vehicle 1 based on various types of information acquired from the map storage unit 20, the host vehicle position estimation unit 21, the map information processing unit 22, the sensor information processing unit 23, and the moving object action prediction unit 25.

Here, as illustrated in FIG. 2, the blind spot region 320 is a region that cannot be detected by the external-field recognition sensor 12 of the vehicle 1 due to obstacles such as other vehicles 300, fences, and signboards under construction around the vehicle 1.

Note that, as described above, the blind spot object estimation unit 24 acquires the various types of information from the map storage unit 20, the host vehicle position estimation unit 21, the map information processing unit 22, the sensor information processing unit 23, and the moving object action prediction unit 25, but the input lines from the respective units such as the map storage unit 20 are omitted.

The blind spot object estimation unit 24 estimates the type and action of the blind spot object 310 based on a feature amount (surrounding information, travel use information of the host vehicle) extracted from the surrounding information of the host vehicle from the sensor information processing unit 23 or the map information from the map information processing unit 22.

A potential risk 330 is, for example, a region that is not manifested as a risk that the blind spot object 310 may possibly jump out from the blind spot region 320, but may become a risk in the future.

As a method of estimating the blind spot object 310, there is a method of estimating the type of the blind spot object 310 based on the feature amount of a road situation extracted from the surrounding information detected by the sensor information processing unit 23 and the map information by the map information processing unit 22. For example, it is possible to estimate whether the blind spot object 310 is a vehicle, a bicycle, or a pedestrian in consideration of various types of information such as the presence or absence of a fence between a road and a sidewalk, a surrounding park and time information, the presence or absence of a school zone, the color of a signal (blinking red and yellow), a road sign, an accident occurrence point based on past information, a parked vehicle or an emergency vehicle, or a normal vehicle, jumping out between oncoming vehicles when an oncoming lane is congested, the presence or absence of a crosswalk, the entrance of various stores, the vicinity of the entrance of a parking lot, and the like.

Alternatively, it is also conceivable to statistically predict the type of the blind spot object 310 based on information learned in advance by inputting point cloud information and image information obtained from the external-field recognition sensor 12 of the vehicle 1 to a statistical model such as a neural network. Furthermore, it is also conceivable to predict only an action tendency of the blind spot object 310 instead of the type. A method of predicting a linear action tendency when the blind spot object 310 is predicted to be a child even when the shape of the blind spot object 310 is predicted to be in a stationary state is also conceivable.

The information of the blind spot object 310 estimated in this manner is used as blind spot object estimation information at the time of generating a future trajectory considering a potential risk to be described later.

In FIG. 1, the respective outputs of the host vehicle position estimation unit 21, the map information processing unit 22, the sensor information processing unit 23, the moving object action prediction unit 25, and the blind spot object estimation unit 24 are input to a future trajectory generation unit 26 considering the potential risk. The future trajectory generation unit 26 considering the potential risk generates the future trajectory of the vehicle 1 (host vehicle) in consideration of the potential risk from the blind spot object 310 estimated by the blind spot object estimation unit 24 and the surrounding information of the vehicle 1 (host vehicle).

The future trajectory generation unit 26 calculates the future trajectory considering the potential risk based on route information and a current vehicle state (speed, direction, position, and the like) so that the vehicle 1 does not collide with a surrounding moving object such as another vehicle.

Note that the future trajectory considering the potential risk means a future trajectory on which the vehicle 1 does not collide with another vehicle or a surrounding moving object and on which the vehicle 1 can stop or travel, or a future trajectory on which the vehicle 1 can travel or stop so as to minimize a blind spot of the external-field recognition sensor 12 in order to minimize the potential risk as much as possible based on the route information and the current vehicle state (speed, direction, position, and the like).

Figure 3:
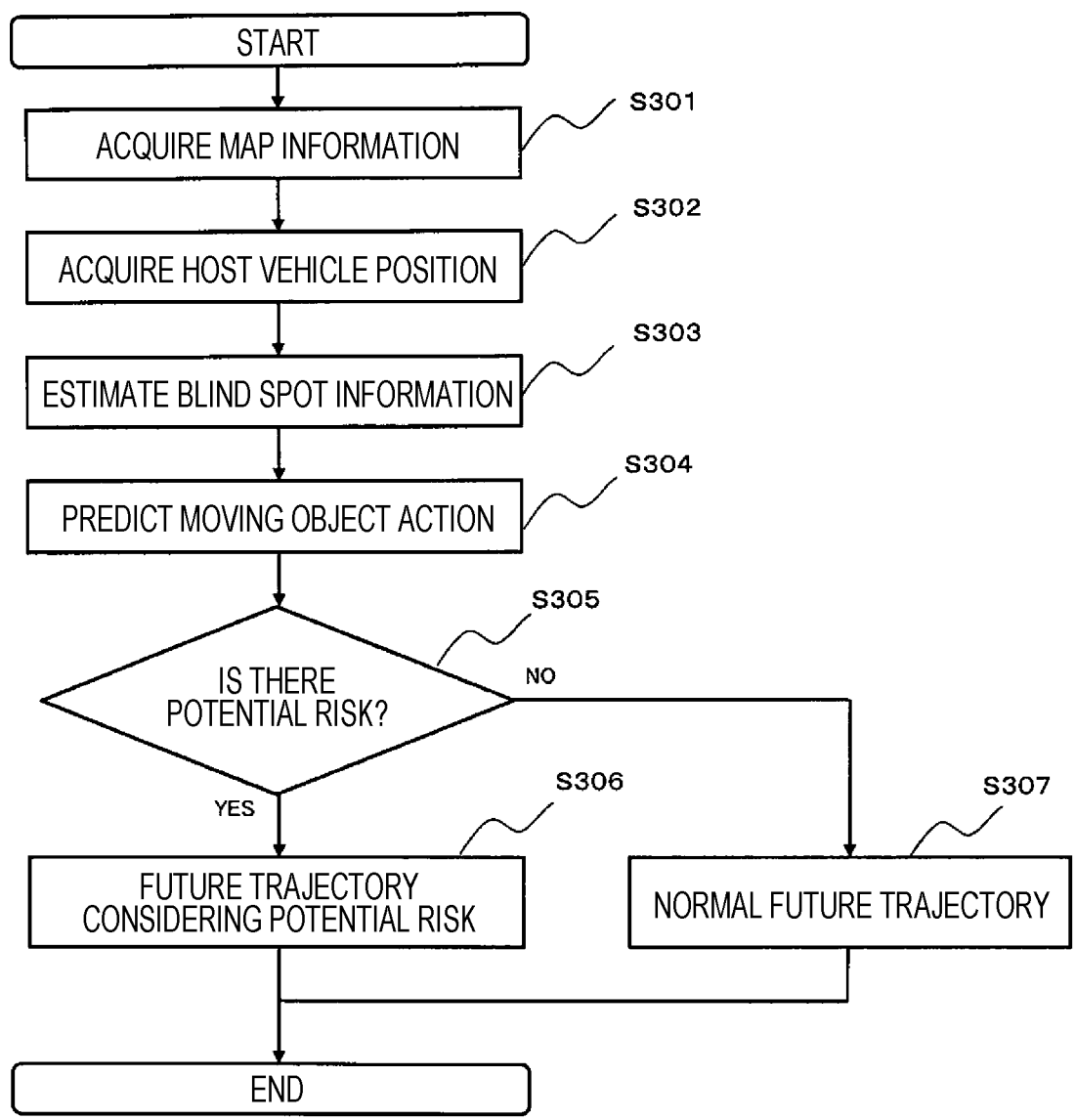
FIG. 3 is a flowchart for explaining an operation until a future trajectory considering a potential risk is generated in the vehicle control device.

FIG. 3 is a flowchart for explaining an operation until a future trajectory considering a potential risk is generated in the vehicle control device 10. Each step in FIG. 3 will be described below.

(FIG. 3: Step S301 (Map Information Acquisition))

A travel route, a road shape, traffic light information, a traffic rule database, and the like are acquired from the external-field recognition sensor 12 and stored in the map storage unit 20.

(FIG. 3: Step S302 (Host Vehicle Position Acquisition))

The location where the vehicle 1 is present is estimated based on information obtained by a GNSS (global navigation satellite system) of the external-field recognition sensor 12 and the like.

(FIG. 3: Steps S303 to S304 (Blind Spot Information Estimation, Moving Object Action Prediction))

A future position and a future speed of each moving object are calculated by using outputs of the host vehicle position estimation unit 21, the map information processing unit 22, and the sensor information processing unit 23 as inputs. A potential risk is calculated in consideration of a risk for a future trajectory and a risk based on blind spot information estimated by the blind spot information estimation unit 24.

(FIG. 3: Steps S305 (Whether or not there is Potential Risk), S306 (Future Trajectory Considering Potential Risk), and S307 (Normal Future Trajectory))

When there is a potential risk in Steps S303 to S304 (S305: YES), a future trajectory considering a potential risk is generated (Step: S306). When there is no potential risk (S305: NO), a future trajectory based on a lane center line may be generated, or a future trajectory adapted to a steering operation of a driver may be generated (Step: S307).

A past trajectory generation unit 30 that generates the past traveling trajectory of the vehicle 1 (host vehicle) may perform generation based on the future trajectory considering the potential risk generated by the future trajectory generation unit 26, or may perform generation based on position information acquired from the global navigation satellite system (GNSS).

As an example, generation of a past trajectory from the future trajectory considering the potential risk will be described.

In the past trajectory generation, a vehicle speed V (m/s) detected by the wheel speed sensor 11, a front wheel steering angle δ (rad) detected by the steering angle sensor 13, a stability factor A of the vehicle 1, and a wheelbase l (m) of the vehicle 1 are acquired to calculate the yaw rate γ (rad/s), and calculate the rotational translational change amount of the vehicle 1. The yaw rate γ can be represented by the following Expression (1).

[Math. 1]

$$\gamma = \frac{1}{1+AV^2}\frac{V}{l}\delta \qquad (1)$$

Note that, instead of acquiring the front wheel steering angle δ, calculation can be performed by using the detection value of a yaw rate sensor.

Figure 4A:
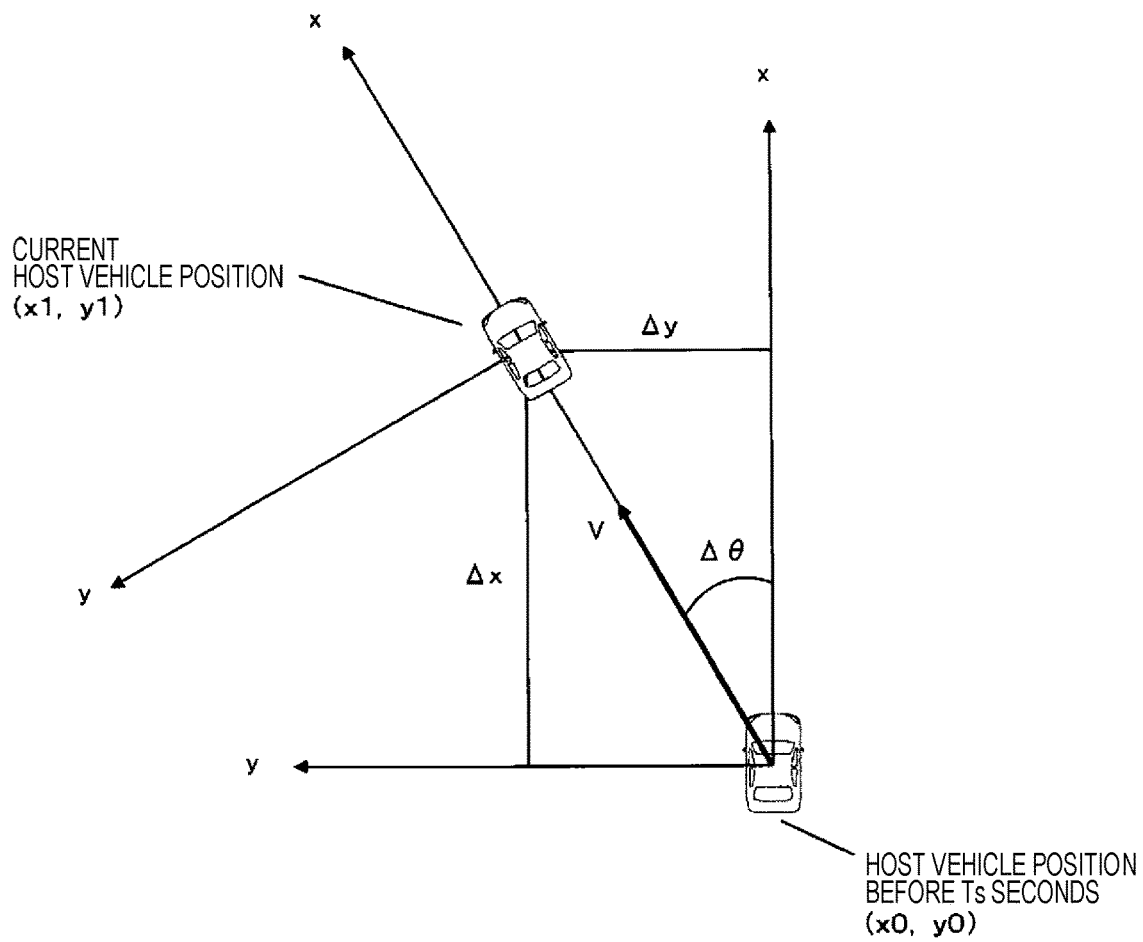
FIG. 4A is a diagram illustrating a rotational translational change amount of a vehicle from one calculation cycle to the current time.

FIG. 4A is a diagram illustrating a rotational translational change amount of the vehicle 1 per calculation cycle TS (s), that is, from a time before one calculation cycle to the current time. In addition, FIG. 4B is an explanatory diagram of a sideslip angle of the vehicle 1.

Figure 4B:
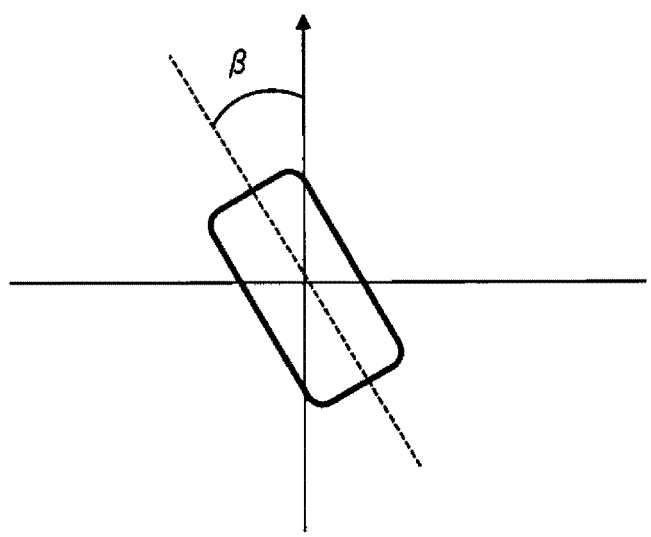
FIG. 4B is an explanatory diagram of a sideslip angle of the vehicle.

When the rotational change amount of the vehicle 1 is set as Δθ (rad), the translational change amount of the vehicle 1 in a vehicle length direction is set as Δx (m), the translational change amount of the vehicle 1 in a vehicle width direction is set as Δy (m) as illustrated in FIG. 4A, and the sideslip angle of the vehicle 1 is set as β as illustrated in FIG. 4B, Δθ, β, Δx, and Δy can be represented by the following expressions (2) to (4).

[Math. 2]

$$\Delta\theta = \gamma \times Ts \qquad (2)$$

[Math. 3]

$$\Delta x = V \times Ts \times \cos(\Delta\theta - \beta) \qquad (3)$$

[Math. 4]

$$\Delta y = V \times Ts \times \sin(\Delta\theta - \beta) \qquad (4)$$

The sideslip β illustrated in FIG. 4B is calculated by acquiring the weight m (kg) of the vehicle 1, the distance lf (m) from the center of gravity of the vehicle 1 to the front wheels, the distance lr (m) from the center of gravity of the vehicle 1 to the rear wheels, the wheelbase l (m) of the vehicle 1, the vehicle speed V (m/s) detected from the wheel speed sensor 11, the stability factor A of the vehicle 1, the front wheel steering angle δ (rad) of the vehicle 1, and the cornering power Kr of the vehicle 1.

The sideslip β can be represented by the following mathematical expression (5).

[Math. 5]

$$\beta = \frac{1 - \frac{ml_f}{2ll_rK_r}V^2}{1+AV^2}\frac{l_r}{l}\delta \qquad (5)$$

The affine transformation is performed on the future trajectory considering the potential risk by using the change amounts Δθ, Δx, and Δy of the vehicle 1, and the result of the affine transformation is stored as the past trajectory for each calculation cycle.

Figure 5A:
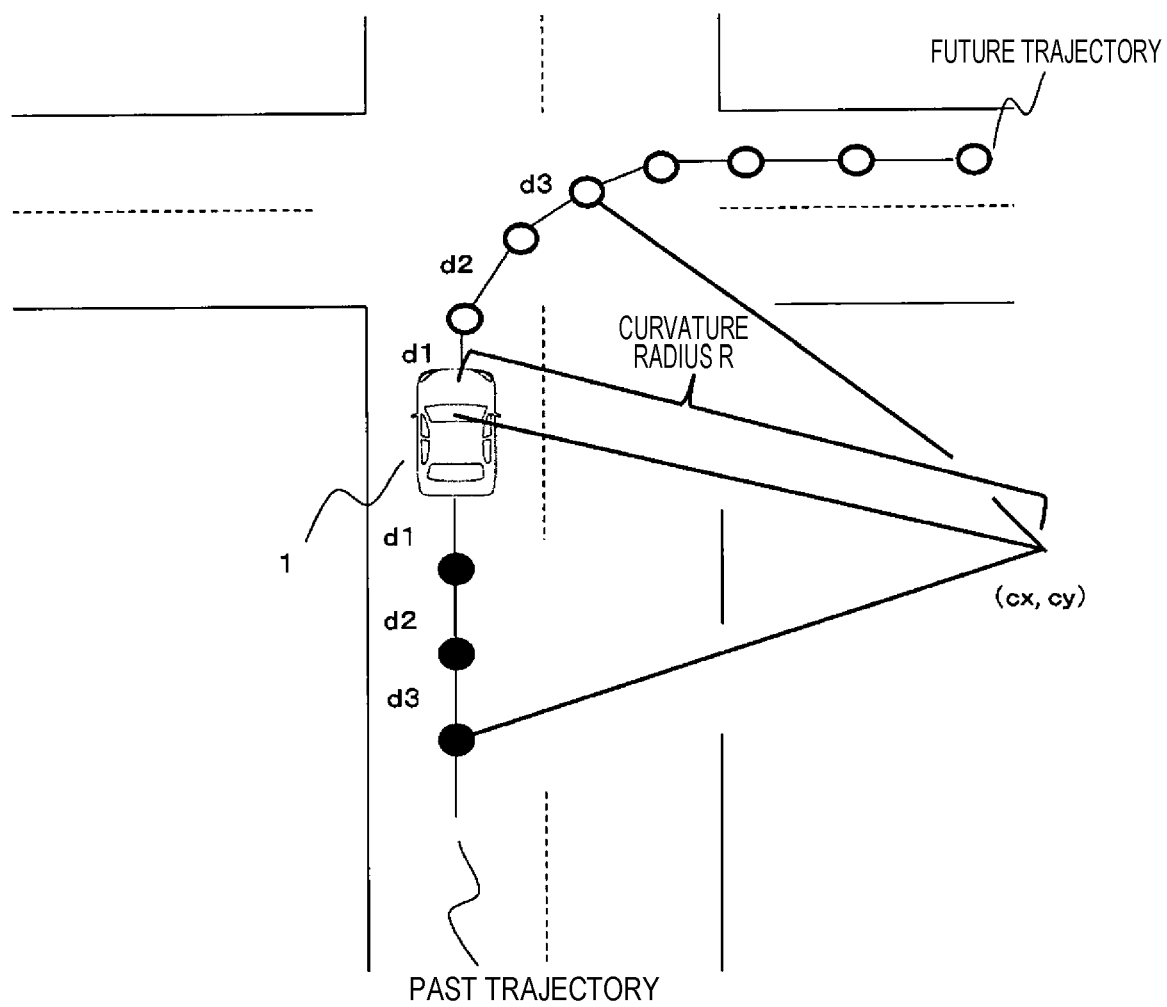
FIG. 5A is a diagram illustrating coordinate points for the future trajectory of the vehicle and coordinate points for a past trajectory.

A curvature radius calculation unit 31 that calculates the curvature radius of the curve on which the vehicle 1 (host vehicle) travels will be described with reference to FIG. 5A. FIG. 5A is a diagram illustrating coordinate points for the future trajectory of the vehicle 1 and coordinate points for a past trajectory. In FIG. 5A, a circle passing through a coordinate point on the future trajectory considering the potential risk at the future time Ts (s), a coordinate point of the past trajectory, and any point in consideration of the potential risk at the is calculated, and a radius of the circle is set as a curvature radius R.

FIG. 5A is a diagram in which the curvature radius R is calculated from each coordinate point. Assuming that the center coordinates of the circle are (cx, cy), the curvature radius R can be represented by the following expressions (6) to (8).

[Math. 6]

$$(x1-cx)^2+(y1-cy)^2=R^2 \qquad (6)$$

[Math. 7]

$$(x2-cx)^2+(y2-cy)^2=R^2 \qquad (7)$$

[Math. 8]

$$(x3-cx)^2+(y3-cy)^2=R^2 \qquad (8)$$

As the three points for calculating the curvature radius R, coordinate points separated from any one point by the same distance are used. The distance is, for example, the sum of d1, d2, and d3 in FIG. 5A. As a result of calculating the distance, when the distance is between the coordinate point and the coordinate point, the curvature radius is calculated by an inner split point or linear interpolation between the coordinate points.

Figure 5B:
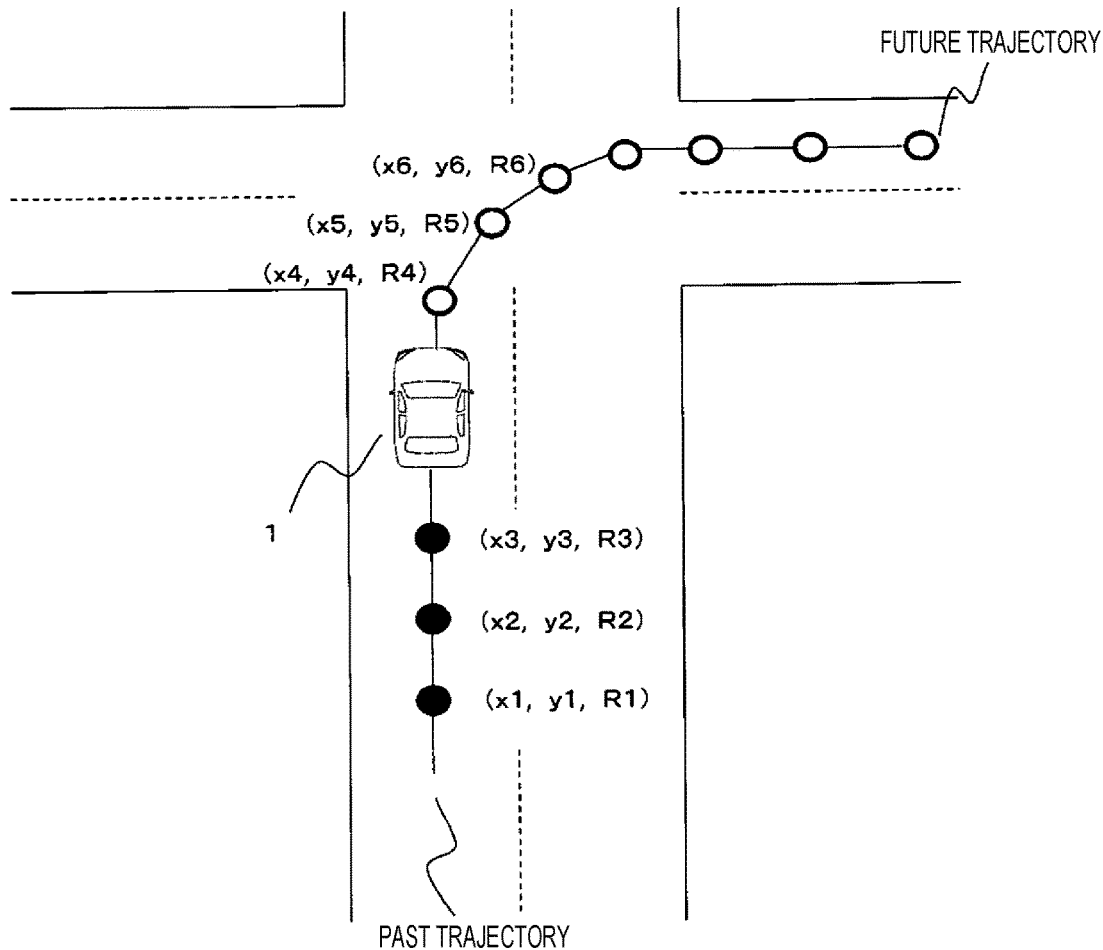
FIG. 5B is a diagram illustrating a result of adding information on a curvature radius R to each coordinate point.

The calculated curvature radius R is added to information of each coordinate point of the future trajectory and is expressed by information of (x1, y1, R1), •••, and (xN, yN, RN). FIG. 5B illustrates a result of adding information on the curvature radius R to each coordinate point.

Figure 6:
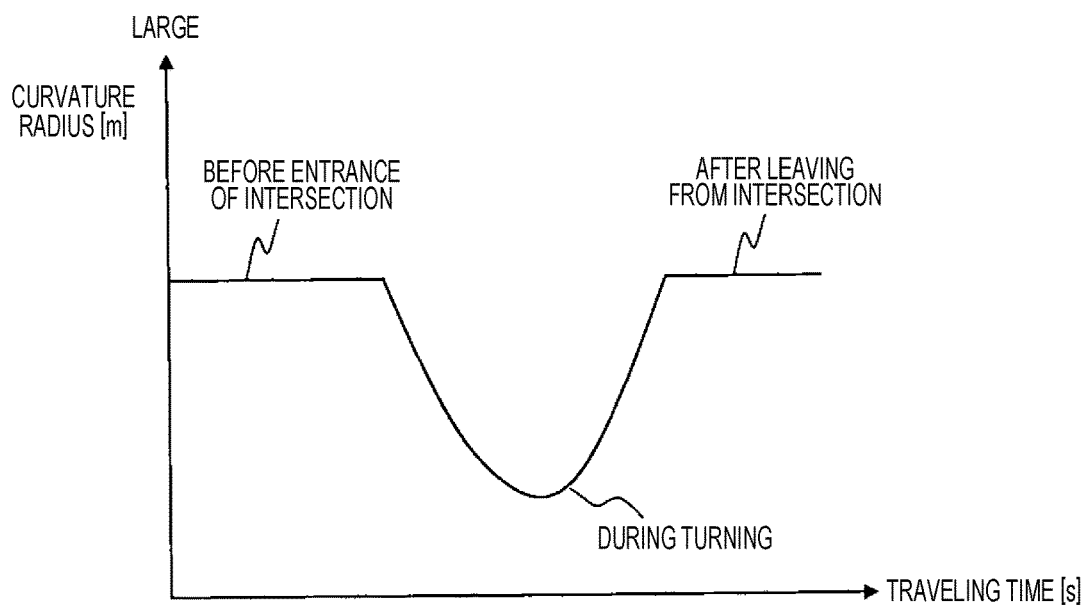
FIG. 6 is an explanatory diagram of curve determination.

Next, the curve determination unit 32 will be described with reference to FIG. 6. FIG. 6 is an explanatory diagram of curve determination. In FIG. 6, the vertical axis indicates the curvature radius (m), and the horizontal axis indicates the traveling time. The curve determination unit 32 determines whether the vehicle 1, which is the host vehicle, travels in a curve.

When the vehicle 1 turns right at an intersection as illustrated in FIG. 2, the curvature radius R before entering the intersection has a small change amount (inclination a). Thus, it can be determined that the vehicle 1 is traveling on a straight line.

Then, when the vehicle 1 enters the intersection, the curvature radius R is calculated to gradually decrease. The change amount (inclination a) of the curvature radius R stored at each coordinate point of the future trajectory and the past trajectory can be calculated and it can be determined that the vehicle 1 has entered the intersection. This corresponds to a case during turning illustrated in FIG. 6.

Then, when the vehicle 1 exits the intersection, the curvature radius R is calculated to gradually increase. The change amount (inclination a) of the curvature radius R stored at each coordinate point of the future trajectory and the past trajectory is calculated, and it can be determined that the vehicle 1 has left the intersection. The change amount (inclination a) of the curvature radius R can be represented by the following expression (9).

[Math. 9]

$$a = \frac{\sum_{n=1}^{n}(x_1(\text{inter} - \text{coordinate distance}) - \overline{x}(\text{inter} - \text{coordinate distance average})(y_i(\text{curvature radius}) - \overline{y}(\text{curvature radius average}))}{\sum_{n=1}^{n}(x_1(\text{inter} - \text{coordinate distance}) - \overline{x}(\text{inter} - \text{coordinate distance average})^2} \quad (9)$$

A speed calculation unit 33 calculates the actual vehicle speed of the vehicle 1 (calculates the speed of the host vehicle) based on wheel speed information acquired from the wheel speed sensor 11.

A target steering angle calculation unit 40 calculates a target steering angle of the vehicle 1 based on the curvature radius calculated and output by the curvature radius calculation unit 31 and input information of an output of the determination result of the curve determination unit 32. First, the target steering angle calculation unit 40 determines the value of the curvature radius R at each coordinate point from the input of the curve determination unit 32. For example, the curvature radius R on the past trajectory of the vehicle 1 is used at the time of entering the curve, and the curvature radius R on the future trajectory of the vehicle 1 is used at the time of exiting the curve.

The target steering angle is calculated by acquiring the curvature radius R, the vehicle speed V obtained by the wheel speed sensor 11, the wheelbase l of the vehicle 1, the stability factor A of the vehicle 1, the gear_ratio of the vehicle 1, and the front wheel steering angle δ. The target steering angle can be represented by the following expressions (10) and (11).

[Math. 10]

$$\delta = (1 + AV^2)\frac{l}{R} \quad (10)$$

[Math. 11]

$$\text{Target steering angle} = \delta \times \text{gear\_ratio} \quad (11)$$

The target steering angle calculation unit 40 outputs the calculated target steering angle to the steering device 14. The steering device 14 drives the steering to reach the target steering angle output by the target steering angle calculation unit 40.

A target acceleration/deceleration calculation unit 41 corrects the speed of the vehicle 1 calculated by the speed calculation unit 33 based on the future trajectory considering the potential risk, which has been generated by the future trajectory generation unit 26 considering the potential risk, and calculates the target acceleration/deceleration. This speed correction is performed because, when the vehicle 1 continues traveling at the current speed, and a moving object having a speed higher than that of the blind spot object 310 estimated from the blind spot region 320 jumps out (for example, when the blind spot object 310 is estimated to be a pedestrian but is actually a bicycle), it is necessary to avoid a collision by a rapid deceleration.

However, in this case, the ride comfort of the vehicle 1 is significantly deteriorated. Thus, when the vehicle 1 passes near the blind spot region 320, the vehicle 1 is decelerated in advance to a target blind spot passing speed lower than the current speed. By decelerating the vehicle 1 in advance, even when a moving object having a speed higher than that of the estimated blind spot object 310 jumps out, it is possible to alleviate the degree of a rapid deceleration and suppress deterioration of ride comfort.

The target acceleration/deceleration calculated by the target acceleration/deceleration calculation unit 41 is a target acceleration and a target deceleration, and the target acceleration is output to the engine control device 16. The engine control device 16 controls the engine so that the vehicle 1 (host vehicle) has the target acceleration calculated by the target acceleration/deceleration calculation unit 41.

Further, the target deceleration calculated by the target acceleration/deceleration calculation unit 41 is output to the brake control device 15. The brake control device 15 controls the brake so that the vehicle 1 (host vehicle) has the target deceleration calculated by the target acceleration/deceleration calculation unit 41.

The target acceleration/deceleration calculation unit 41 outputs the target acceleration to the engine control device 16 or outputs the target deceleration to the brake control device 15.

Figure 7:
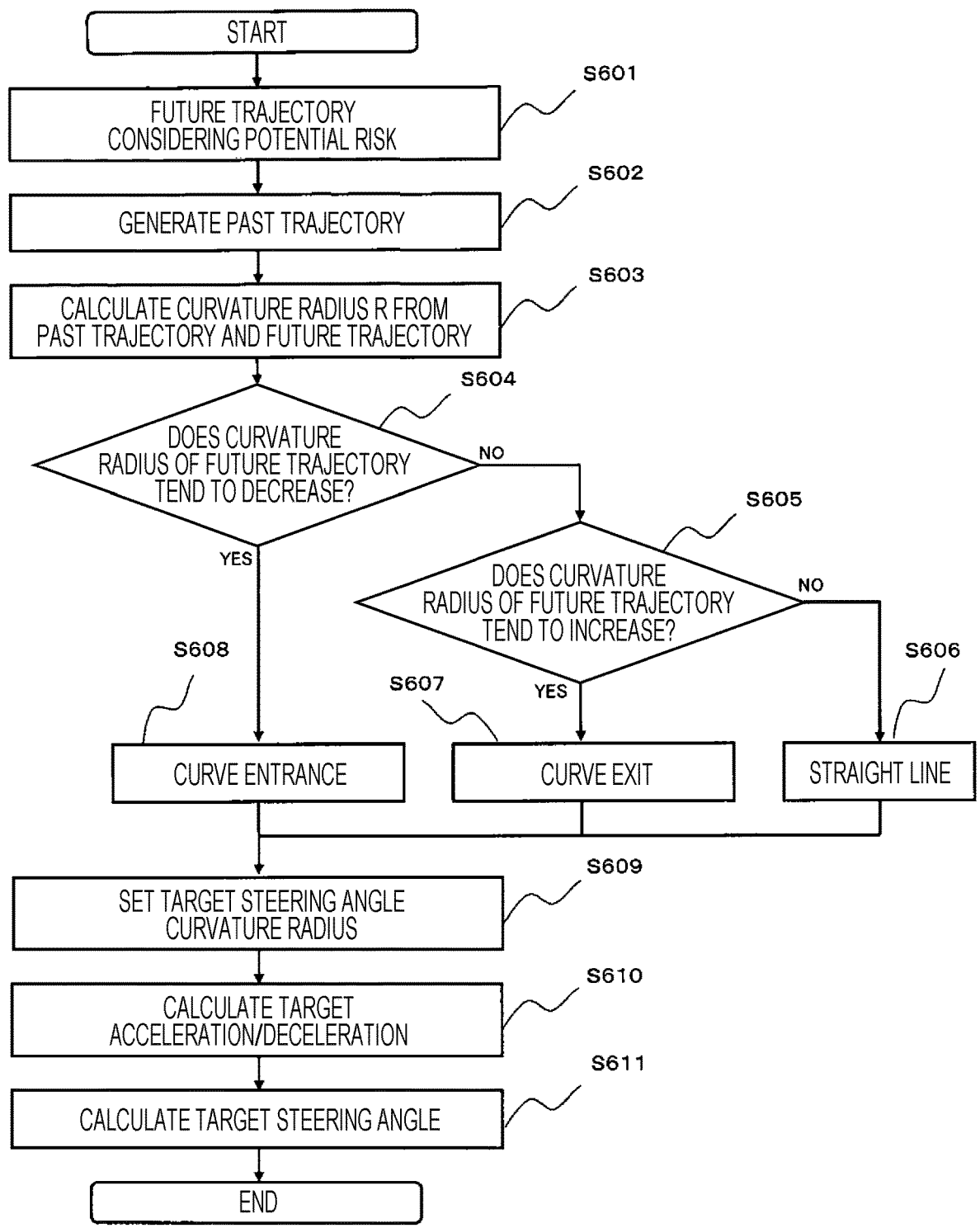
FIG. 7 is a flowchart for explaining an operation until a target steering angle is calculated from the future trajectory considering the potential risk.

FIG. 7 is a flowchart for explaining an operation until a target steering angle is calculated from the future trajectory considering the potential risk in the vehicle control device 10. Each step in FIG. 7 will be described below.

(FIG. 7: Steps S601 to S603)

In Steps 601 and 602, the past trajectory is generated from the future trajectory considering the potential risk, which has been generated from the respective outputs of the host vehicle position estimation unit 21, the map information processing unit 22, the sensor information processing unit 23, the moving object action prediction unit 25, and the blind spot object estimation unit 24. Then, in Step S603, the curvature radius is calculated from the past trajectory and the future trajectory. The future trajectory considering the potential risk includes a trajectory considering ride comfort such as an acceleration by an engine and a deceleration by a brake.

Figure 8A:
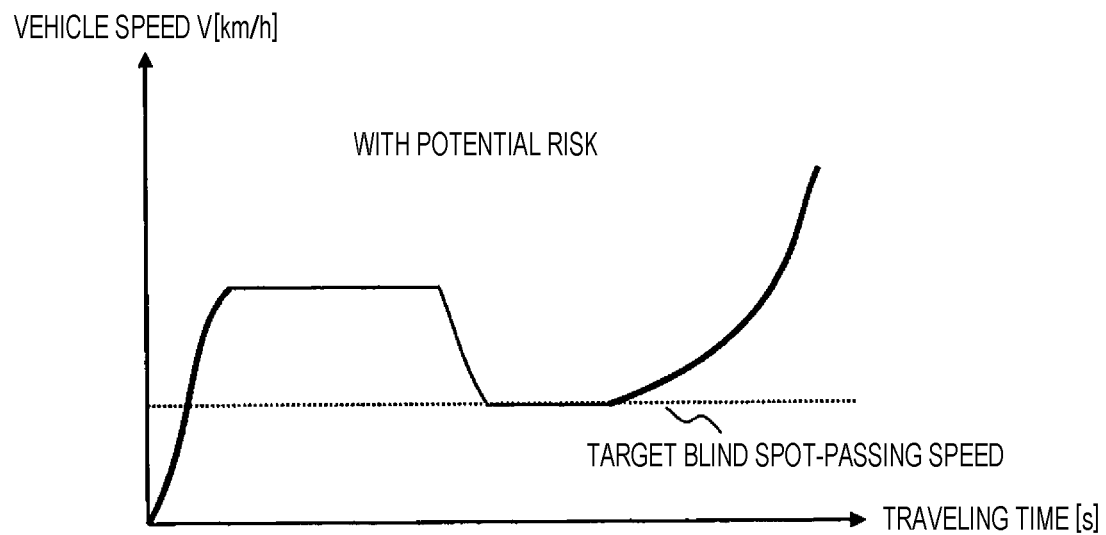
FIG. 8A is a diagram illustrating an acceleration/deceleration when there is the potential risk.
Figure 8B:
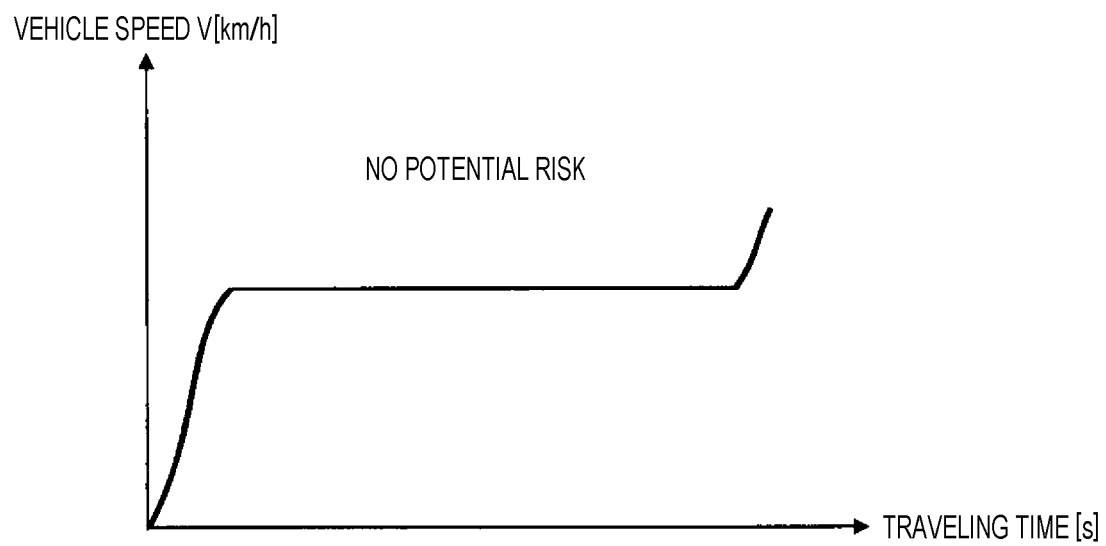
FIG. 8B is a diagram illustrating the acceleration/deceleration when there is no potential risk.

FIG. 8A is a diagram illustrating an acceleration/deceleration when there is a potential risk, and FIG. 8B is a diagram illustrating an acceleration/deceleration when there is no potential risk.

When there is a potential risk while turning right or left at an intersection, a T-junction, or the like, acceleration/deceleration is performed in the middle of turning. When the acceleration/deceleration is performed, it is conceivable that the distance between trajectory track point arrays of the future trajectory considering the potential risk changes back and forth.

In the related art, when the future trajectory is generated from the lane center line, curve fitting or linear fitting using an approximate expression is used. In a case of a curve of about R 100, an actual future trajectory and an approximate trajectory are almost the same. However, in a case of a curve of about R 10 such as a right or left turn at an intersection, an error of the approximate future trajectory increases.

Furthermore, in the case of trajectory following control using curve fitting or linear fitting using the approximate expression, the result of the approximate expression changes each time the distance between the track point arrays increases or decreases, and there is a concern about deterioration of ride comfort. On the other hand, when the curvature radius is used, the influence is small even when the distance between the trajectory point arrays changes. Thus, it is possible to perform the automatic driving control so as not to deteriorate the ride comfort.

Although an example in which the past trajectory is generated from the future trajectory has been described, the past trajectory may be generated from the GNSS (global navigation satellite system). The curvature radius R information is added to each trajectory point by using the generated past trajectory and the future trajectory considering the potential risk.

(FIG. 7: Steps S604 to S605)

If the change amount (inclination) in the curvature radius R of the future trajectory considering the potential risk tends to decrease (step: S604 YES), it can be determined that the vehicle is approaching the entrance of the curve. If the change amount (inclination) in the curvature radius R of the future trajectory considering the potential risk tends to increase (step: S605 YES), it can be determined that the vehicle is approaching the exit of the curve. When it is not a curve entrance or a curve exit, control is performed as a straight line.

(FIG. 7: Steps S606 to S609)

When it is determined as a straight line in Step S606, in curvature radius setting (Step S609) for the target steering angle, the curvature radius R is defined to be equal to or greater than R 1000. When the curve entrance is determined in Step S608, in the curvature radius setting (Step S609) for the target steering angle, the curvature radius R of the past trajectory is used from the center of gravity of the vehicle 1. Although it is assumed from the center of gravity of the vehicle 1, the center of the vehicle 1, the center of the front wheel axle, or the center of the rear wheel axle of the vehicle 1 may be used.

When the curve exit is determined in Step S607, in the curvature radius setting (Step S609) for the target steering angle, the curvature radius R of the future trajectory considering the potential risk is used from the center of gravity of the vehicle 1. Although it is assumed from the center of gravity of the vehicle 1, the center of the vehicle 1, the center of the front wheel axle, or the center of the rear wheel axle of the vehicle 1 may be used.

(FIG. 7: Step S610)

The target acceleration/deceleration is calculated from the future trajectory considering the potential risk and the current speed of the vehicle 1. For the target acceleration/deceleration, the blind spot object 310 jumping out of the blind spot region 320 is estimated, and speed control is performed in advance so as not to cause rapid deceleration.

(FIG. 7: Step S611)

The target steering angle is calculated by using the curvature radius R set in Step S609 and the target acceleration/deceleration calculated in Step S610. When the target steering angle is calculated with the curvature radius R, it is necessary to calculate the rotation direction of the vehicle 1. As a method of obtaining the rotation direction, for example, the rotation direction may be calculated from the coordinate points of the future trajectory considering the potential risk, or the rotation direction may be calculated by using an outer product of vectors.

In the embodiment, the curvature radius and the target steering angle (target steering amount) are set such that the lateral acceleration of the vehicle 1 (host vehicle) is smaller than 0.2 G.

Figure 9:
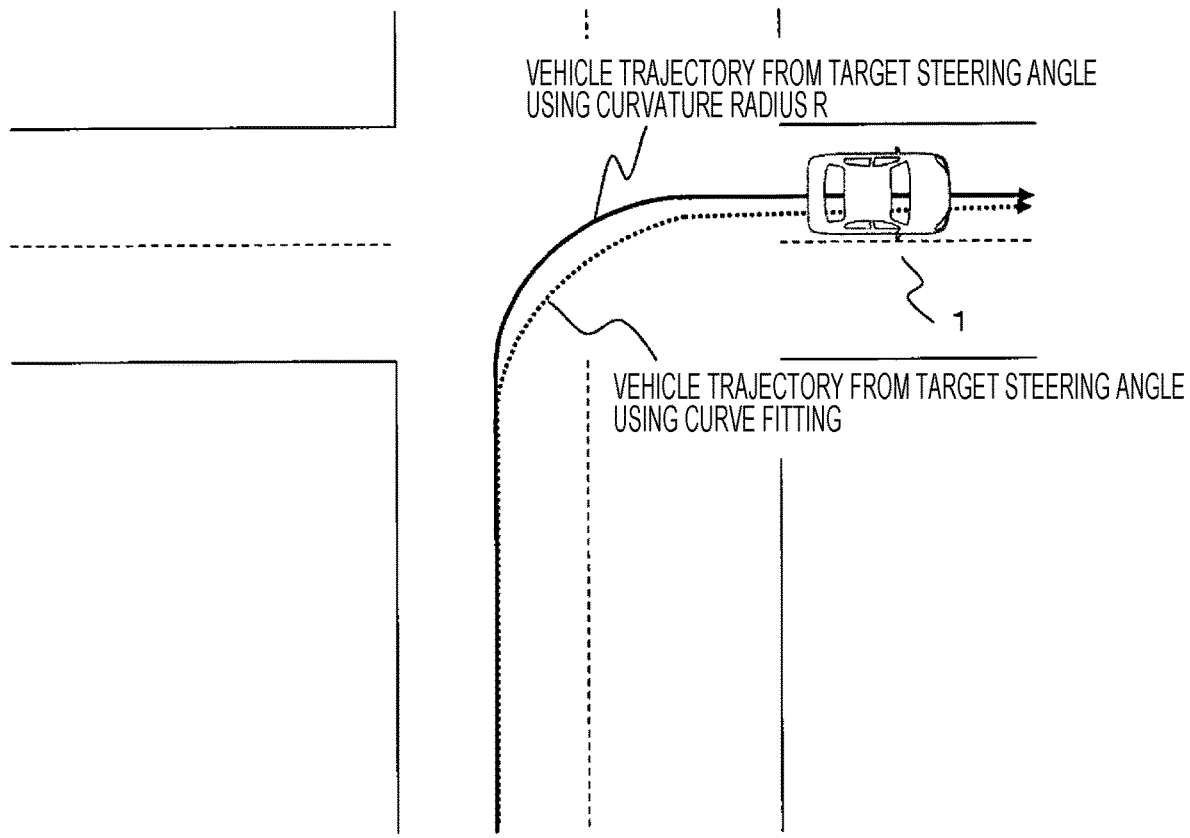
FIG. 9 is a diagram illustrating a case (solid line) of turning right at an intersection by using the curvature radius R and a case (broken line) of turning right at the intersection by using curve fitting.

FIG. 9 is a diagram illustrating a case (solid line) of turning right at an intersection by using the curvature radius R and a case (broken line) of turning right at the intersection by using curve fitting. Since the calculation of the target steering angle by curve fitting is an approximate expression, it is conceivable to travel on the inner side of the future trajectory considering the potential risk, and traveling on the inner side causes the lateral G of the vehicle 1 to be strongly applied, and there is a concern that the ride comfort is deteriorated.

The vehicle control device 10 using the curvature radius R does not travel on the inner side of the future trajectory considering the potential risk, and can smoothly connect the curvature radius R by using the curve determination unit 32.

As described above, the vehicle control device 10 can perform automatic driving control without deteriorating the turning performance of the host vehicle even when acceleration/deceleration occurs on the future trajectory considering the potential risk.

As described above, according to the embodiment of the present invention, the vehicle control device 10 includes the blind spot object estimation unit 24 that detects the blind spot region 320 of the external-field recognition sensor 12 that recognizes an external field and estimates the blind spot object 310 potential in the blind spot region 320, the future trajectory generation unit 26 that generates a future trajectory of the vehicle 1 in consideration of the potential risk from the blind spot object 310 estimated by the blind spot object estimation unit 24 and surrounding information of the vehicle 1 being the host vehicle, and the target steering angle calculation unit 40 that calculates the curvature radius at which the vehicle 1 travels from the future trajectory generated by the future trajectory generation unit 26 and the past trajectory of the vehicle 1, and calculates the target steering angle of the vehicle 1 from the calculated curvature radius and an acceleration/deceleration of the vehicle 1. Then, the blind spot object in the blind spot region that is undetectable by the external-field recognition sensor 12 is estimated, the curvature radius and the speed of the vehicle 1 when the vehicle 1 turns at a rapidly decelerated speed are calculated, and the calculated curvature radius and the target steering angle are output to the steering device 14. The steering device 14 is configured to control the steering in accordance with the target steering angle.

Therefore, it is possible to realize a vehicle control device and a vehicle control system capable of performing automatic driving control that does not reduce turning accuracy of a host vehicle even when an object in a blind spot is different from an estimation and a vehicle speed decreases due to rapid deceleration.

The present invention is not limited to the above embodiment, and various modification examples may be provided. For example, the above embodiment is described in detail in order to explain the present invention in an easy-to-understand manner, and the above embodiment is not necessarily limited to a case including all the described configurations.

Some or all of the configurations, functions, processing units, processing means, and the like may be realized in hardware by being designed with an integrated circuit, for example.

Further, the above-described respective components, functions, and the like may be realized by software by the processor interpreting and executing a program for realizing the respective functions. Information such as a program, a table, and a file, that realizes each function can be stored in a memory, a recording medium such as a hard disk and a solid state drive (SSD), or a recording medium such as an IC card, an SD card, and a DVD.

REFERENCE SIGNS LIST 1 host vehicle
10 vehicle control device
11 wheel speed sensor
12 external-field recognition sensor
13 steering angle sensor
14 steering device
15 brake control device
16 engine control device
20 map storage unit
21 host vehicle position estimation unit
22 map information processing unit
23 sensor information processing unit
24 blind spot object estimation unit
25 moving object action prediction unit
26 future trajectory generation unit considering potential risk
30 past trajectory generation unit
31 curvature radius calculation unit
32 curve determination unit
40 target steering angle calculation unit
41 target acceleration/deceleration calculation unit
300 other vehicle
310 blind spot object
320 blind spot region
330 potential risk

The invention claimed is:

1. A vehicle control device comprising one or more processors to:
   detect a blind spot region of an external-field recognition sensor that recognizes an external field and estimate a blind spot object potential in the blind spot region;
   generate a future trajectory of a host vehicle in consideration of a potential risk from the blind spot object estimate and surrounding information of the host vehicle;
   calculate a curvature radius at which the host vehicle travels from the future trajectory and a past trajectory of the host vehicle, and calculate a target steering angle of the host vehicle from the calculated curvature radius and an acceleration or deceleration of the host vehicle performed in response to generating the potential risk;
   calculate a rotation direction of the host vehicle based on coordinate points of the future trajectory in consideration of the potential risk; and
   control the host vehicle in accordance with the target steering angle and the rotation direction.

2. The vehicle control device according to claim 1, wherein the one or more processors to estimate a type and an action of the blind spot object based on a feature amount extracted from the surrounding information of the host vehicle or map information.

3. The vehicle control device according to claim 2, the one or more processors further to:
   receive an input of the surrounding information obtained based on external field information from a sensor that recognizes the external field;
   convert the surrounding information into object information of a moving object existing around the host vehicle;
   output the object information as the surrounding information of the host vehicle; and
   generate and output travel use information that is usable for automatic driving of the host vehicle from the map information,
   wherein the one or more processors estimate the type and the action of the blind spot object based on the feature amount extracted from the surrounding information of the host vehicle or the map information.

4. The vehicle control device according to claim 3, the one or more processors further to:
   estimate a position of the host vehicle; and
   predict an action of the moving object existing around the host vehicle based on the surrounding information, the travel use information, and the position of the host vehicle,
   wherein the one or more processors generate the future trajectory of the host vehicle based on the travel use information, the position of the host vehicle, the type and action of the blind spot object estimate, and the action of the moving object.

5. The vehicle control device according to claim 4, the one or more processors further to:
   calculate a speed of the host vehicle; and
   correct the speed of the host vehicle calculated, based on the future trajectory, and calculates a target acceleration or deceleration.

6. The vehicle control device according to claim 5, the one or more processors further to:
   determine whether the host vehicle travels in a curve and output a determination result; and
   calculate the curvature radius of the curve on which the host vehicle travels,
   wherein the one or more processors calculate the target steering angle of the host vehicle based on the curvature radius and the determination result.

7. The vehicle control device according to claim 6, wherein the one or more processors
   set the curvature radius and the target steering angle such that a lateral acceleration of the host vehicle is smaller than 0.2 G.

8. A vehicle control system comprising:
   an external-field recognition sensor that detects and recognizes an external field;
   an engine control device;
   a brake control device;
   a steering device; and
   a vehicle control device including one or more processors to:
   output a target acceleration to the engine control device or output a target deceleration to the brake control device, and calculate a target steering angle and output the target steering angle to the steering device,
   wherein the one or more processors
   detect a blind spot region of the external-field recognition sensor that recognizes the external field and estimates a blind spot object potential in the blind spot region,
   estimate a blind spot object in the blind spot region that is undetectable by the external-field recognition sensor,
   generate a future trajectory of a host vehicle in consideration of a potential risk from the blind spot object estimate and surrounding information of the host vehicle,
   calculate a curvature radius at which the host vehicle travels from the future trajectory and a past trajectory of the host vehicle, calculate the target steering angle of the host vehicle from the calculated curvature radius and the target acceleration or the target deceleration of the host vehicle, and the steering device controls steering in accordance with the target steering angle.

\* \* \* \* \*